(12) United States Patent
Gunderman et al.

(10) Patent No.: US 7,812,257 B2
(45) Date of Patent: Oct. 12, 2010

(54) COVER PLATE WITH INTEGRAL SHELF

(76) Inventors: Bryce Robert Gunderman, 150 Lucius Gordon Dr. Suite 205, W. Henrietta, NY (US) 14586; Robert Dale Gunderman, 150 Lucius Gordon Dr. Suite 205, W. Henrietta, NY (US) 14586

( * ) Notice: Subject to any disclaimer, the term of this patent is extended or adjusted under 35 U.S.C. 154(b) by 284 days.

(21) Appl. No.: 12/210,151

(22) Filed: Sep. 12, 2008

(65) Prior Publication Data

US 2010/0065297 A1 Mar. 18, 2010

(51) Int. Cl.
*H02G 3/14* (2006.01)
(52) U.S. Cl. ............... 174/66; 174/67; 220/241; 439/136
(58) Field of Classification Search ............ 174/66, 174/67; 220/241, 242; 439/136, 143–147; D8/353; D13/177
See application file for complete search history.

(56) References Cited

U.S. PATENT DOCUMENTS 2,392,445 A * 1/1946 Anderson ............... 439/527
4,835,343 A 5/1989 Graef et al.
7,067,737 B2 6/2006 Mallen

OTHER PUBLICATIONS

Web pages from www.buypowershelf.com dated Sep. 21, 2009. http://www.buypowershelf.com. Author Unknown. Two pages.
Lisa Miller. "Area Woman Invents Product". Mansfield, Ohio News Journal (newspaper). Dec. 23, 2008. Page 7C (two pages).
Lynne Phillips. "Westmeister Plugged Into Future With Power Shelf Invention". Willard Times-Junction. Willard, Ohio. Feb. 9, 2009. Front page and p. 3 (two pages).

* cited by examiner

*Primary Examiner*—Dhiru R Patel
(74) *Attorney, Agent, or Firm*—Patent Technologies, LLC

(57) ABSTRACT

A cover plate for covering a wall box mounted wiring device such as an electrical receptacle. The cover plate includes an attachment member for covering the wall box opening, at least one opening for at least one wiring device, and a shelf attached to the attachment member. The shelf may also have a non-slip surface or be pitched in such a way that an electronic device such as a cell phone will not fall off. The shelf may also have a lip or raised edge to retain the electronic device. In use, an electronic device will rest on the shelf while charging. The charger plug will be conveniently inserted into the electrical receptacle that is directly below the shelf, with the electronic device resting neatly on the integral shelf. The cover plate reduces clutter related to charging electronic devices in areas such as kitchens or bathrooms. The cover plate may also be used to hold other items such as keys, wallets, watches, clocks, remote controls, and the like.

12 Claims, 14 Drawing Sheets

COVER PLATE WITH INTEGRAL SHELF

BACKGROUND OF THE INVENTION

1. Field of the Invention

This invention relates generally to cover plates for electrical outlets and switches, and more particularly to a novel cover plate useful with electronic devices.

2. Description of the Related Art

With the proliferation of electronic devices such as cell phones, MP3 players, handheld email and text messaging devices, handheld or pocket PCs, and the like, there exists an ongoing need to recharge the batteries in these devices on a regular and ongoing basis. The proliferation of these rechargeable electronic devices create a great deal of clutter in one's living space or office space that, when combined with charging cords, cradles, interface cords, and the like, can become unmanageable or at the least create disorganization. When one charges these devices, an electrical outlet that is at a convenient height with a counter or other surface, is usually used. This outlet is most often located in the kitchen or bathroom, as most remaining electrical outlets in a home are located close to the floor. Unfortunately, this means that cell phones are commonly charged in the kitchen or bathroom, and take up valuable counter space. The clutter of electronic devices, chargers, and cables also creates a less than desirable visual landscape in one's home. In the past, there have been attempts to manage this situation through the use of charging cradles or charging stands. Unfortunately, while creating a neater visual appearance, these cradles and stands still take up valuable counter space.

Recently there have been attempts to retain cell phones and similar electronic devices in holders that are adhered to the wall, presumably adjacent and in close proximity to an electrical outlet. A search of the internet will reveal many of these devices. These holders introduce yet another item of clutter, and may further damage the wall through the use of adhesives, glue, tape, and the like.

The present invention and the various embodiments described and envisioned herein solve the currently unmet need of reducing clutter and increasing organization through the improvement and redesign of what has previously been a single purpose item—the electrical outlet cover plate. Electrical outlets and switches (generically, wiring devices) are commonly contained in a wall box where the installed assembly has a cover plate to both provide a measure of safety and to provide a more aesthetically pleasing look. Essentially, the cover plate has been a single purpose item that has only recently taken on an element of fashion or design. In recent years, cover plates have been produced in a multitude of materials and styles to provide a look that conforms to the design, color, and theme of its surroundings. A quick look in the electrical section of a home improvement store will reveal hundreds of cover plate designs, with colors and materials to match almost any décor. These cover plates, while a vast improvement over the basic plastic cover plate of the past, are still a single purpose item that are just visually more aesthetically pleasing. There is no evidence that cover plates of the present have been improved upon to perform additional functions, such as will be described by way of this specification, drawings, and the attached claims. It is therefore an object of the present invention to provide a cover plate with an integral shelf for retaining a device such as, for example, a cell phone, an MP3 player, a handheld computing device, a remote control device, a email device, an electronic organizer, a personal digital assistant, and the like. The device may require charging through the AC electrical outlet that is provided through the cover plate, but the device to be retained may also be an object such as keys, money, a wallet, a watch, an air freshener, a remote control, or the like.

BRIEF SUMMARY OF THE INVENTION

In accordance with the present invention, there is provided a cover plate for covering a wall box mountable wiring device mounted in and to a wall box, said wall box having a width dimension and a height dimension, said cover plate having a width dimension greater than said wall box width dimension and a height dimension greater than said wall box height dimension, the cover plate comprising a unitary, generally planar attachment member having a first end and a second end, at least one mounting hole for permitting said attachment member to be attached adjacent a front face of and over said wiring device mounted in and to said wall box, at least one opening for at least one wiring device, and a shelf attached proximate the first end and above said opening. The foregoing paragraph has been provided by way of introduction, and is not intended to limit the scope of the following claims.

BRIEF DESCRIPTION OF THE DRAWINGS

The invention will be described by reference to the following drawings, in which like numerals refer to like elements, and in which.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification, drawings, and the appended claims.

DESCRIPTION OF THE PREFERRED EMBODIMENTS

Cover plates for electrical outlets and switches are known in the prior art. As is also known in the prior art, cover plates may be made from a plastic such as, for example, nylon or a flame retardant plastic, or they may be made from a metal such as stainless steel, or even wood. Cover plates provide for safety by covering up an open electrical wall box and related wiring. In use, the electrical wall box contains a wiring device such as a receptacle, a ground fault interrupter, a switch, a combination switch and receptacle, or the like. A cover plate then encloses the electrical wall box, wiring, and wiring device, while allowing the receptacle opening or switch to protrude through an opening in the cover plate.

The present invention and its various embodiments depicted herein are directed to a cover plate with an integral shelf. The integral shelf holds an object that may be, but is not limited to, an electronic device such as a cell phone. When the cover plate of the present invention is installed, the shelf is located above the wiring device (such as a receptacle) such that the charging cord of the electronic device may be inserted in the receptacle that is below the shelf, with the electronic device resting neatly on the integral shelf. This makes for a clean and neat arrangement, and reduces clutter that is common on kitchen and bathroom countertops.

Figure 1:
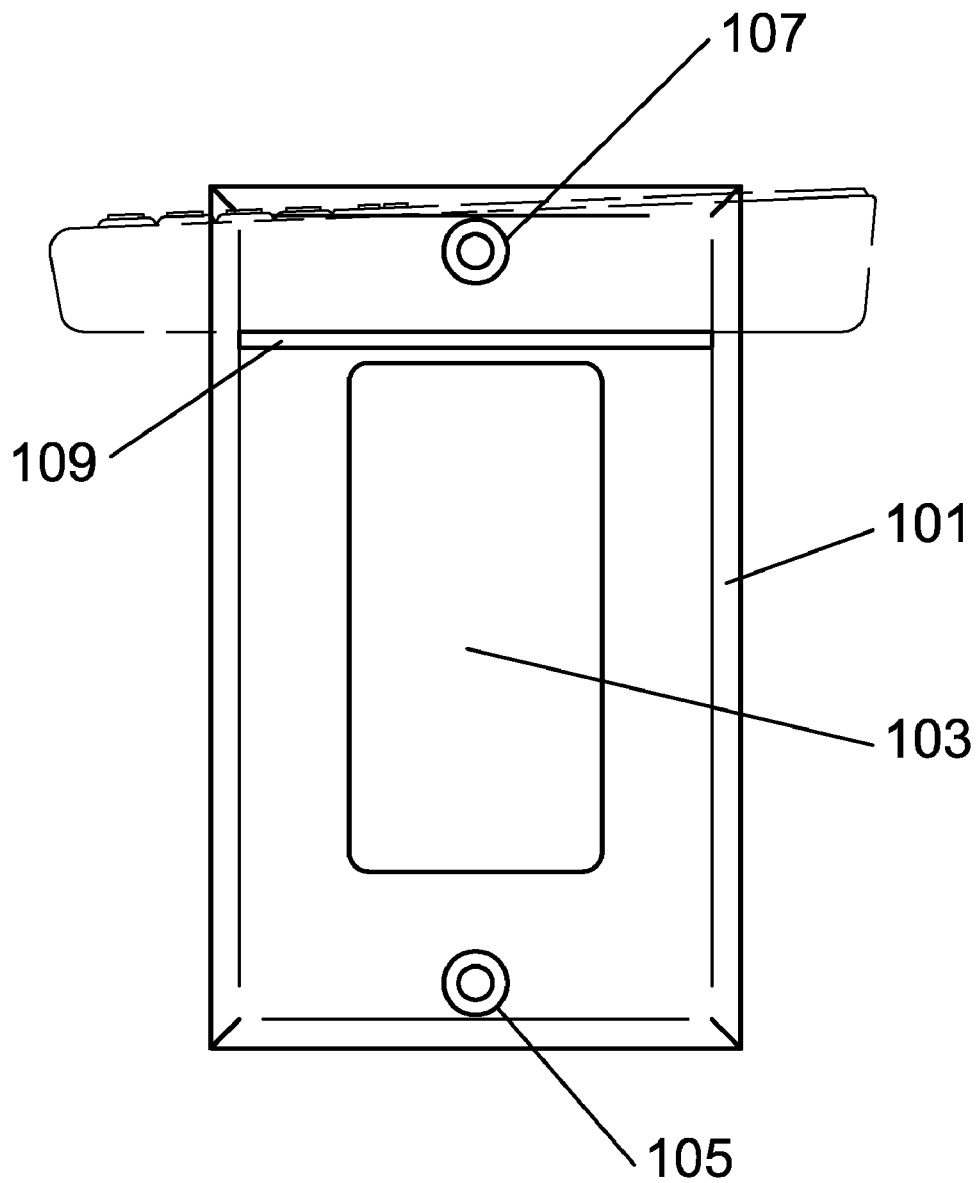
FIG. 1 is a plan view of a cover plate with integral shelf according to one embodiment of the present invention.

Turning to FIG. 1, a plan view of a cover plate with integral shelf according to one embodiment of the present invention is depicted. The attachment member 101 serves to cover the wall box, and is slightly larger than the opening or the wall box to allow for complete coverage of the wall box. In some embodiments of the present invention, the attachment member 101 may be oversized with respect to the opening of the wall box to provide for a certain visual appearance or to hide imperfections in the wall. The attachment member 101 has an opening 103 to allow a wiring device to protrude through the cover plate. The attachment member 101 may be molded using a plastic, or preferably, a flame retardant plastic. An example of a material that may be used is a thermoplastic polyester resin manufactured by DuPont under the trademark "RYNITE FR-530". Other flame retardant plastics include, for example, flame retardant ABS such as Borg-Warner CYCOLAC KJB grade.

In FIG. 1, a Decora® style wiring device may be used in opening 103, and may be an electrical outlet, a switch, a ground fault circuit interrupter, a combined switch and outlet, or the like. Decora® is a registered trademark of Leviton Manufacturing Company of Little Neck, N.Y. A first mounting hole 105 and a second mounting hole 107 are depicted in FIG. 1. To attach the cover plate with integral shelf to a wiring device in an electrical wall box, screws (not shown) may be used. In some embodiments of the present invention, after installation, the mounting holes may be hidden using a false front, screw caps, or other such techniques. An example of techniques to hide screws in a cover plate are disclosed in U.S. Pat. No. 4,835,343 entitled "Two Piece Face Plate For Wall Box Mounted Device", and assigned to Lutron Electronics Co., Inc., of Coopersburg, Pa., the entire disclosure of which is incorporated herein by reference.

The attachment member 101 has a first end or shelf end, and a second end.

Attached proximate the first end of the attachment member 101 is a shelf 109. The shelf 109 may, in some embodiments, be molded along with the attachment member 101 using a plastic, or preferably, a flame retardant plastic. An example of a material that may be used is a thermoplastic polyester resin manufactured by DuPont under the trademark "RYNITE FR-530". Other flame retardant plastics include, for example, flame retardant ABS such as Borg-Warner CYCOLAC KJB grade. In some embodiments of the present invention, the shelf 109 may be made from a metal such as, for example, stainless steel. In some embodiments of the present invention, the shelf may be removable or mechanically attached. A removable shelf does not in any way imply that the shelf is no longer integral.

The shelf 109 protrudes outward from the attachment member in a generally horizontal manner, but may, in some embodiments of the present invention, be slightly pitched such that the shelf slopes downward toward the attachment member. This helps to reduce the likelihood that an object (such as an electronic device in vibrate mode), would fall from the shelf. Other techniques to retain the object, such as a lip or an edge on the shelf, may also be used. In addition, a non-slip surface may be applied to the shelf 109. Examples of non-slip surfaces include elastomeric materials such as a thermoplastic elastomer. An example of a thermoplastic elastomer is SANTOPRENE™ from Advanced Elastomer Systems, Akron, Ohio. The shelf 109 is approximately the width of the attachment member 101, or may be slightly narrower or wider than the width of the attachment member 101. The shelf 101 protrudes outward from the attachment member with a dimension sufficient to hold an electronic device such as, for example, a cell phone. By way of example, and not limitation, this dimension may be in the range of ¾ inch to 2¾ inches. An exemplary dimension is, for example, 1¾ inches. In some embodiments of the present invention, the shelf may be of a thickness that is similar to the thickness of the attachment member 101; that thickness being, for example, ⅛ inch, or in the range of 1/16 inch to ¼ inch. In other embodiments of the present invention, the shelf 101 may be thicker than the thickness of the attachment member, such as, for example, ¼ inch. The dimensions of the shelf 109 may be modified along with the overall geometry of the shelf 101 for aesthetic or functional reasons. For example, the corners of the shelf 109 may have a radius to eliminate sharp edges.

It should further be noted that FIG. 1 depicts a single electrical device cover plate with integral shelf. The present invention may also be adapted to provide a shelf with a multiple electrical device cover plate, such as a two gang, three gang, or four gang arrangement. Such adaptations are within the spirit and scope of the present invention. The present invention may further be adapted to provide a cord holder to contain and organize the charging cord.

To provide a complete understanding of the present invention and the various embodiments described herein, alternate views of the present invention in FIG. 1 are depicted in subsequent FIGS. 2-6.

Figure 2:
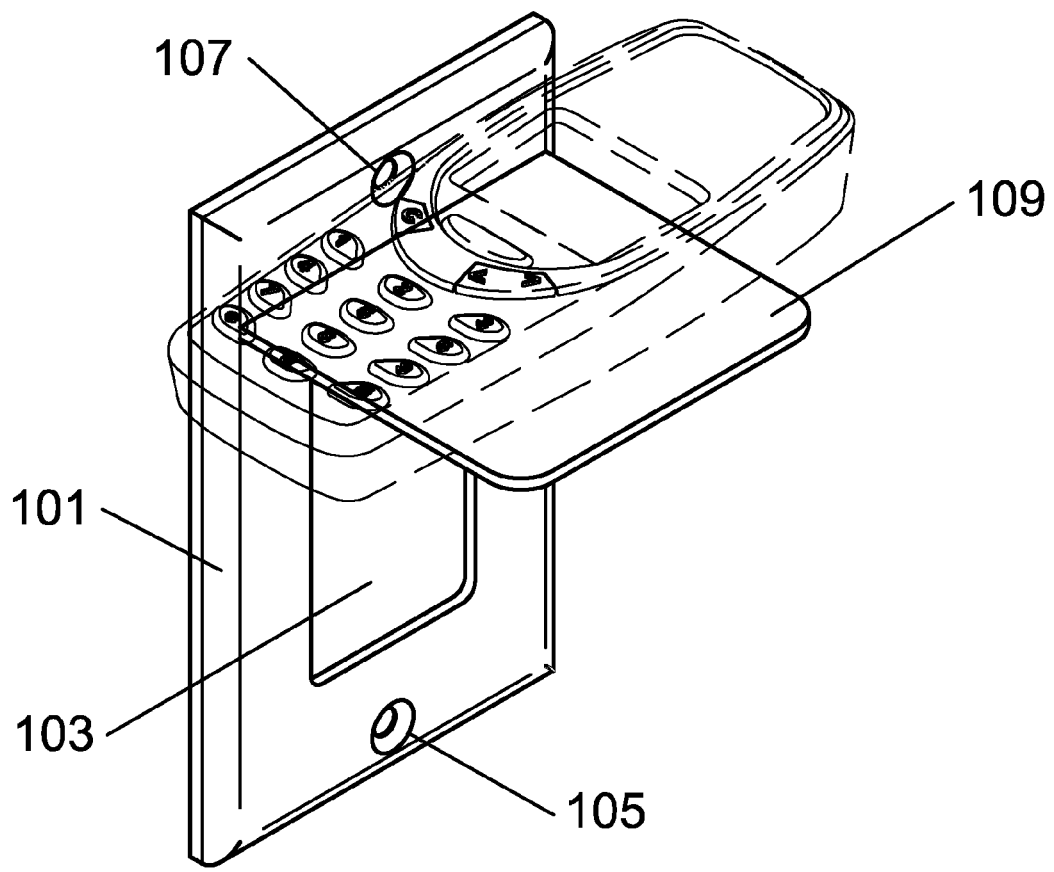
FIG. 2 is a perspective view of the cover plate with integral shelf of FIG. 1.

In FIG. 2, a perspective view of the cover plate with integral shelf of FIG. 1 is depicted, showing the attachment member 101, the opening 103, the first mounting hole 105 and the second mounting hole 107, and the shelf 109. A cell phone is depicted in broken line representation resting on the shelf 109.

Figure 3:
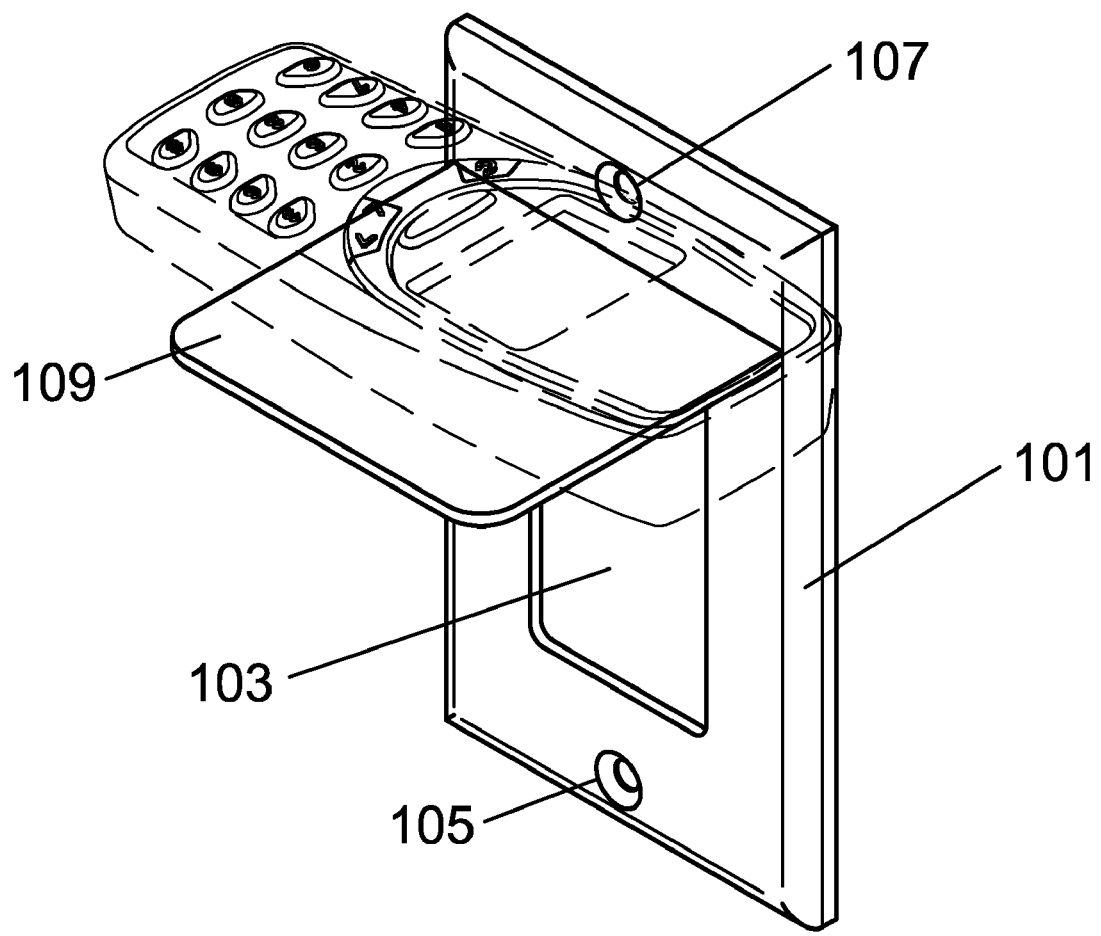
FIG. 3 is an alternate perspective view of the cover plate with integral shelf of FIG. 1.

In FIG. 3, an alternate perspective view of the cover plate with integral shelf of FIG. 1 is depicted, showing the attachment member 101, the opening 103, the first mounting hole 105 and the second mounting hole 107, and the shelf 109. A cell phone is depicted in broken line representation resting on the shelf 109.

Figure 4:
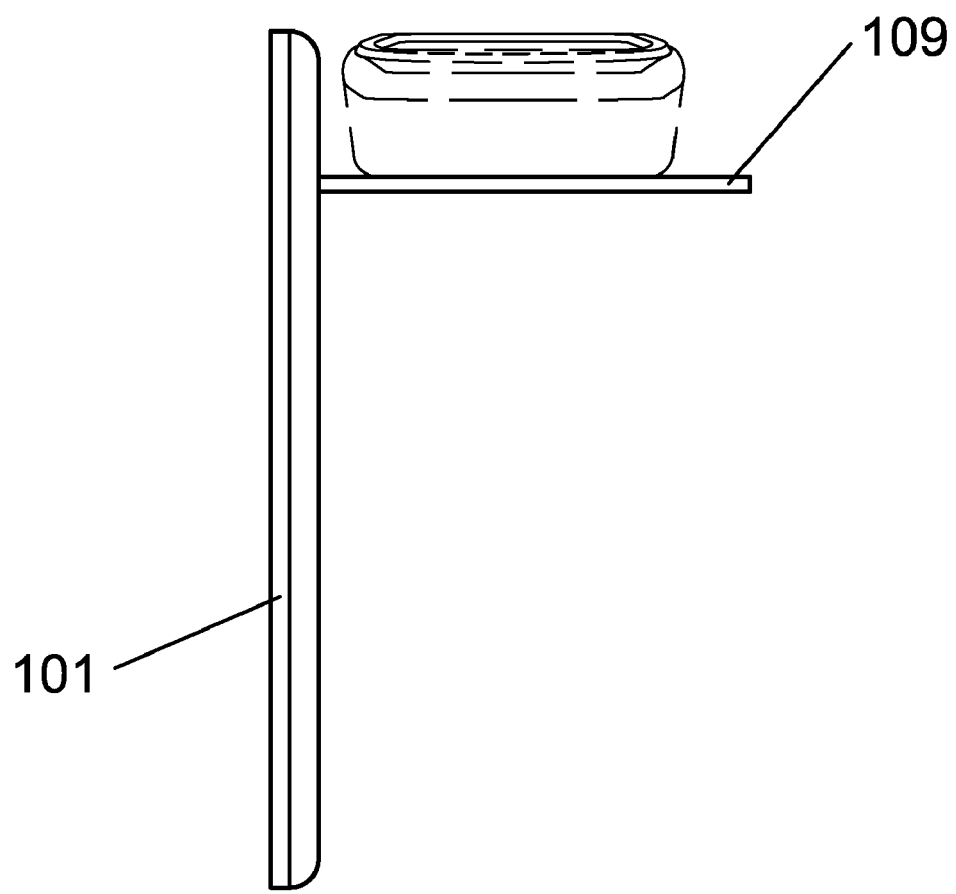
FIG. 4 is a side view of the cover plate with integral shelf of FIG. 1.
Figure 5:
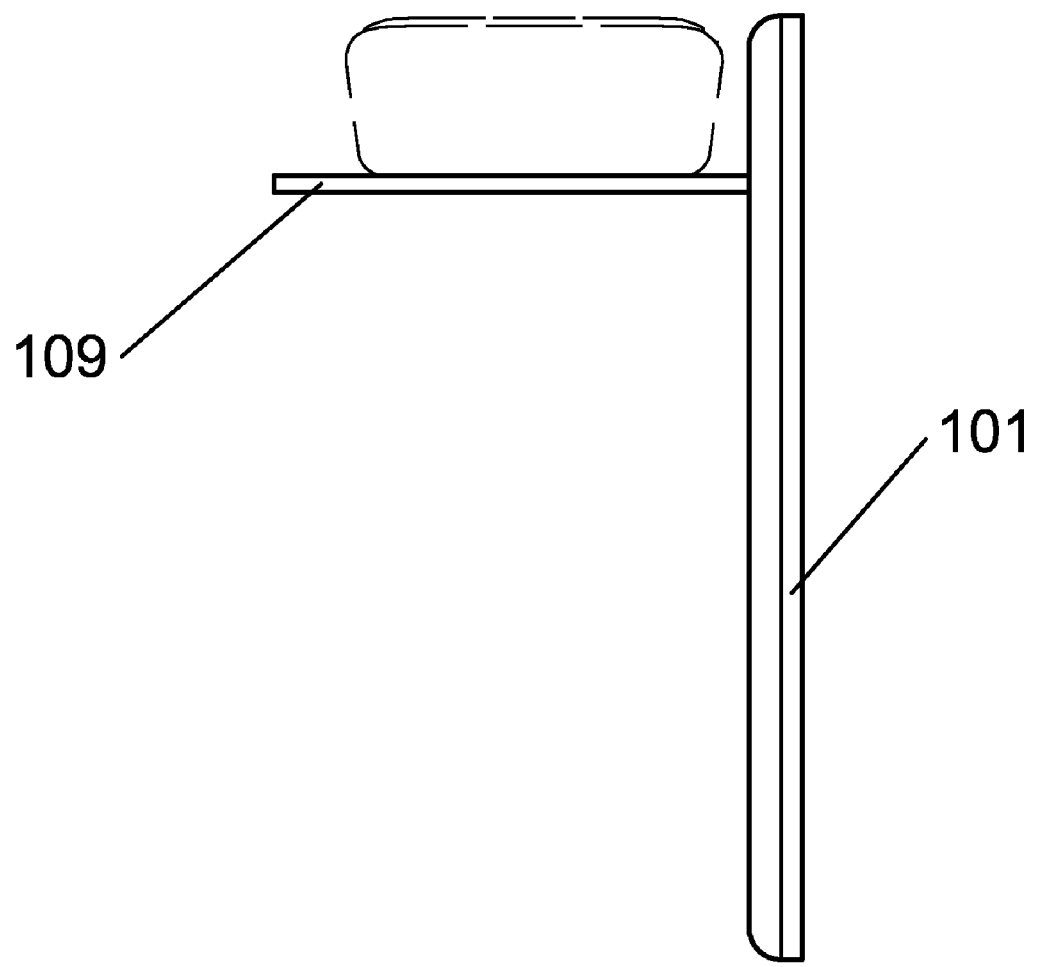
FIG. 5 is an alternate side view of the cover plate with integral shelf of FIG. 1.

In FIG. 4, a side view of the cover plate with integral shelf of FIG. 1 is depicted, showing the attachment member 101 and the shelf 109. A cell phone is depicted in broken line representation resting on the shelf 109. An alternate side view is shown in FIG. 5, with the attachment member 101 and the shelf 109 depicted. A cell phone is depicted in broken line representation resting on the shelf 109.

Figure 6:
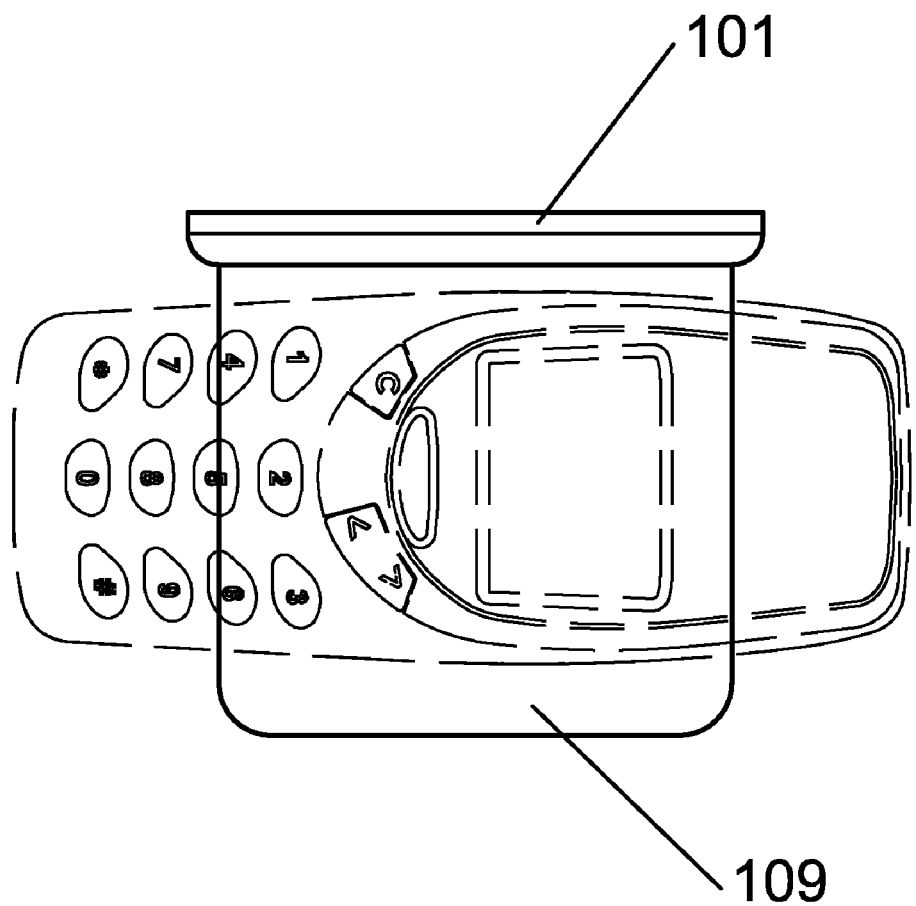
FIG. 6 is a downward looking plan view of the cover plate with integral shelf of FIG. 1.

FIG. 6 is a downward looking plan view of the cover plate with integral shelf of FIG. 1, showing the attachment member 101 and the shelf 109. A cell phone is depicted in broken line representation resting on the shelf 109.

Figure 7:
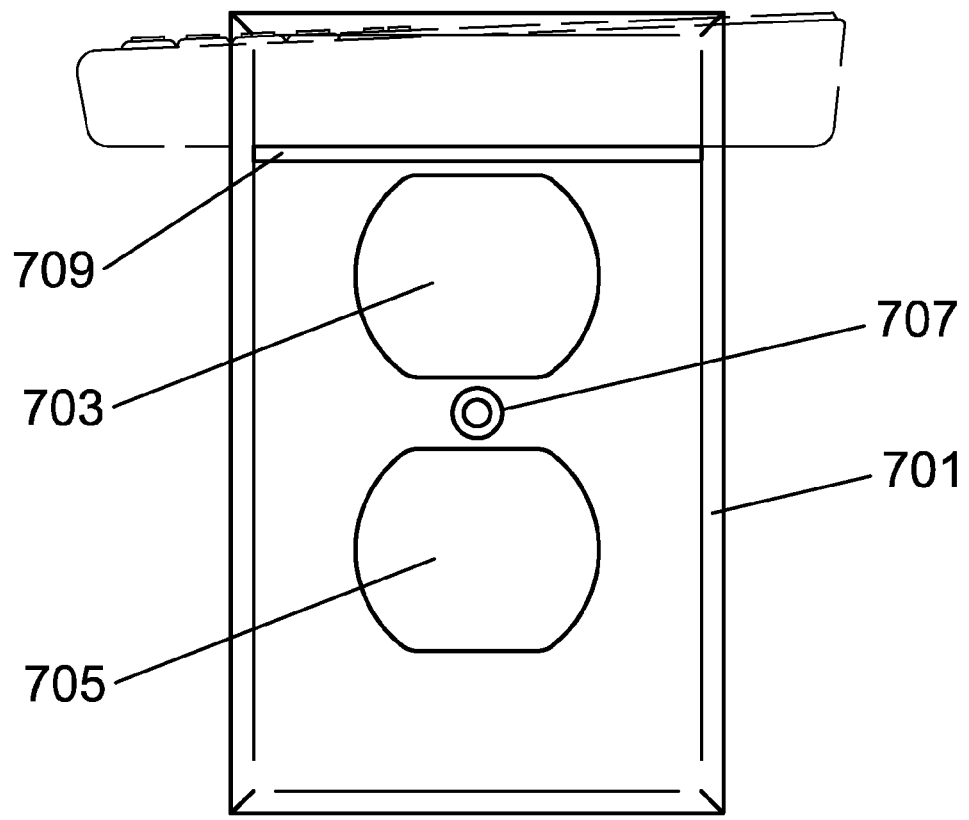
FIG. 7 is a plan view of a cover plate with integral shelf according to a second embodiment of the present invention.

The present invention may also be used with traditional wiring devices. FIG. 7 and subsequent FIGS. 8-12 depict a cover plate with integral shelf for use with traditional wiring devices.

Turning to FIG. 7, a plan view of a cover plate with integral shelf according to a second embodiment of the present invention is depicted. The attachment member 701 serves to cover the wall box, and is slightly larger than the opening of the wall box to allow for complete coverage of the wall box. In some embodiments of the present invention, the attachment member 701 may be oversized with respect to the opening of the wall box to provide for a certain visual appearance or to hide imperfections in the wall. The attachment member 701 has a first opening 703 and a second opening 705 to allow a wiring device to protrude through the cover plate. The attachment member 701 may be molded using a plastic, or preferably, a flame retardant plastic. An example of a material that may be used is a thermoplastic polyester resin manufactured by DuPont under the trademark "RYNITE FR-530". Other flame retardant plastics include flame retardant ABS such as, for example, Borg-Warner CYCOLAC KJB grade.

In FIG. 7, a traditional wiring device, typically an electrical outlet, may be used. A mounting hole 707 is depicted in FIG. 7. To attach the cover plate with integral shelf to a wiring device in an electrical wall box, a screw (not shown) may be used. In some embodiments of the present invention, after installation, the mounting hole may be hidden using a false front, screw caps, or other such techniques. An example of techniques to hide screws in a cover plate are disclosed in U.S. Pat. No. 4,835,343 entitled "Two Piece Face Plate For Wall Box Mounted Device", and assigned to Lutron Electronics Co., Inc., of Coopersburg, Pa., the entire disclosure of which is incorporated herein by reference.

The attachment member 701 has a first end or shelf end, and a second end.

Attached proximate the first end of the attachment member 701 is a shelf 709. The shelf 709 may, in some embodiments, be molded along with the attachment member 701 using a plastic, or preferably, a flame retardant plastic. An example of a material that may be used is a thermoplastic polyester resin manufactured by DuPont under the trademark "RYNITE FR-530". Other flame retardant plastics include, for example, flame retardant ABS such as Borg-Warner CYCOLAC KJB grade. In some embodiments of the present invention, the shelf 709 may be made from a metal such as, for example, stainless steel. In some embodiments of the present invention, the shelf may be removable or mechanically attached. A removable shelf does not in any way imply that the shelf is no longer integral.

The shelf 709 protrudes outward from the attachment member in a generally horizontal manner, but may, in some embodiments of the present invention, be slightly pitched such that the shelf slopes downward toward the attachment member. This helps to reduce the likelihood that an object (such as an electronic device in vibrate mode), would fall from the shelf. Other techniques to retain the object, such as a lip or an edge on the shelf, may also be used. In addition, a non-slip surface may be applied to the shelf 109. Examples of non-slip surfaces include elastomeric materials such as a thermoplastic elastomer. An example of a thermoplastic elastomer is SANTOPRENE™ from Advanced Elastomer Systems, Akron. Ohio. The shelf 709 is approximately the width of the attachment member 701, or may be slightly narrower or wider than the width of the attachment member 701. The shelf 701 protrudes outward from the attachment member with a dimension sufficient to hold an electronic device such as, for example, a cell phone. By way of example, and not limitation, this dimension may be in the range of ¾ inch to 2¾ inches. An exemplary dimension is, for example, 1¾ inches. In some embodiments of the present invention, the shelf may be of a thickness that is similar to the thickness of the attachment member 101; that thickness being, for example, ⅛ inch, or in the range of 1/16 inch to ¼ inch. In other embodiments of the present invention, the shelf 101 may be thicker than the thickness of the attachment member, such as, for example, ¼ inch. The dimensions of the shelf 709 may be modified along with the overall geometry of the shelf 709 for aesthetic or functional reasons. For example, the corners of the shelf 709 may have a radius to eliminate sharp edges.

It should further be noted that FIG. 7 depicts a single electrical device cover plate with integral shelf. The present invention may also be adapted to provide a shelf with a multiple electrical device cover plate, such as a two gang, three gang, or four gang arrangement. Such adaptations are within the spirit and scope of the present invention. The present invention may further be adapted to provide a cord holder to contain and organize the charging cord.

To provide a complete understanding of the present invention and the various embodiments described herein, alternate views of the present invention in FIG. 7 are depicted in subsequent FIGS. 8-12.

Figure 8:
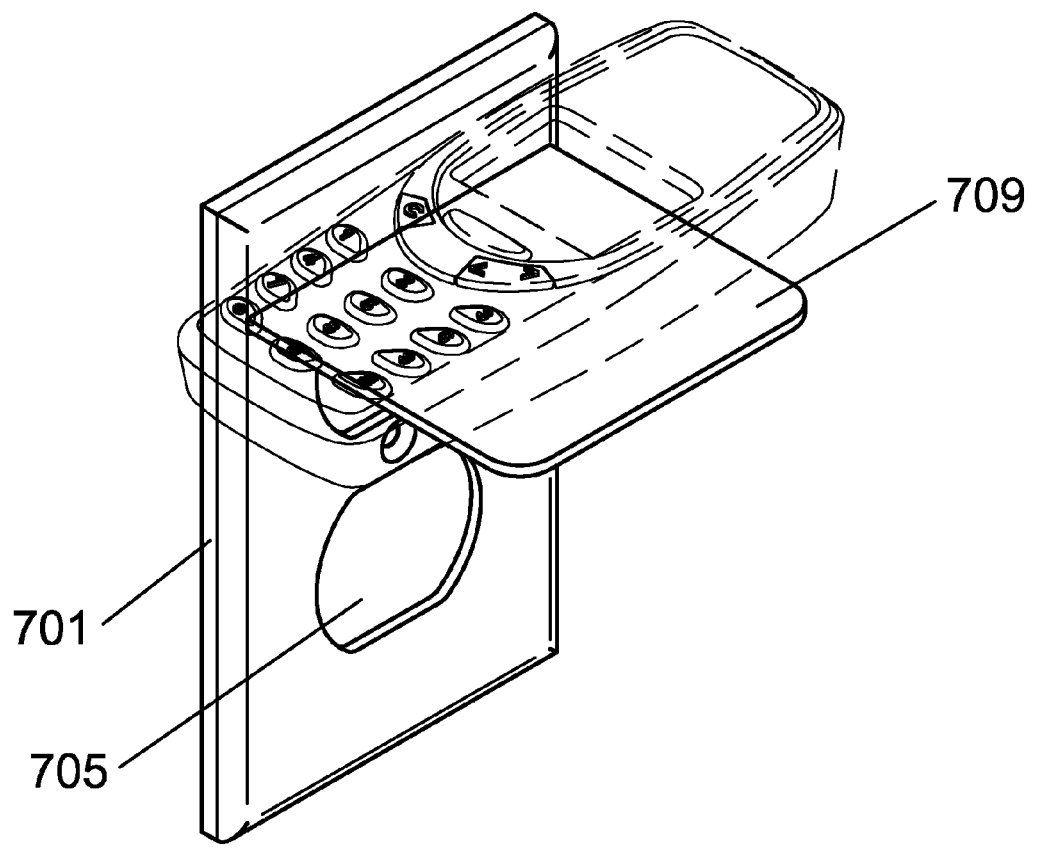
FIG. 8 is a perspective view of the cover plate with integral shelf of FIG. 7.

In FIG. 8, a perspective view of the cover plate with integral shelf of FIG. 7 is depicted, showing the attachment member 701, the second opening 705 (the first opening 703 is not visible), and the shelf 709. A cell phone is depicted in broken line representation resting on the shelf 709.

Figure 9:
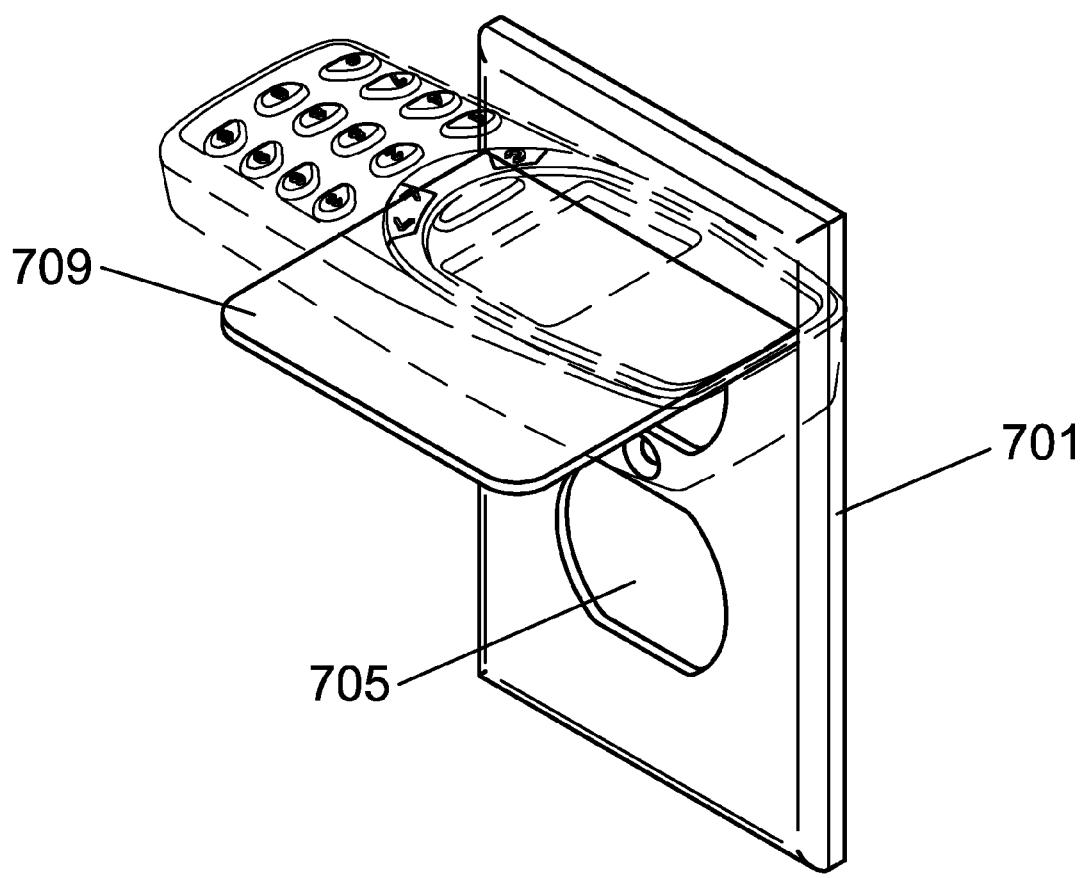
FIG. 9 is an alternate perspective view of the cover plate with integral shelf of FIG. 7.

In FIG. 9, an alternate perspective view of the cover plate with integral shelf of FIG. 7 is depicted, showing the attachment member 701, the second opening 705 (the first opening 703 is not visible), and the shelf 709. A cell phone is depicted in broken line representation resting on the shelf 709.

Figure 10:
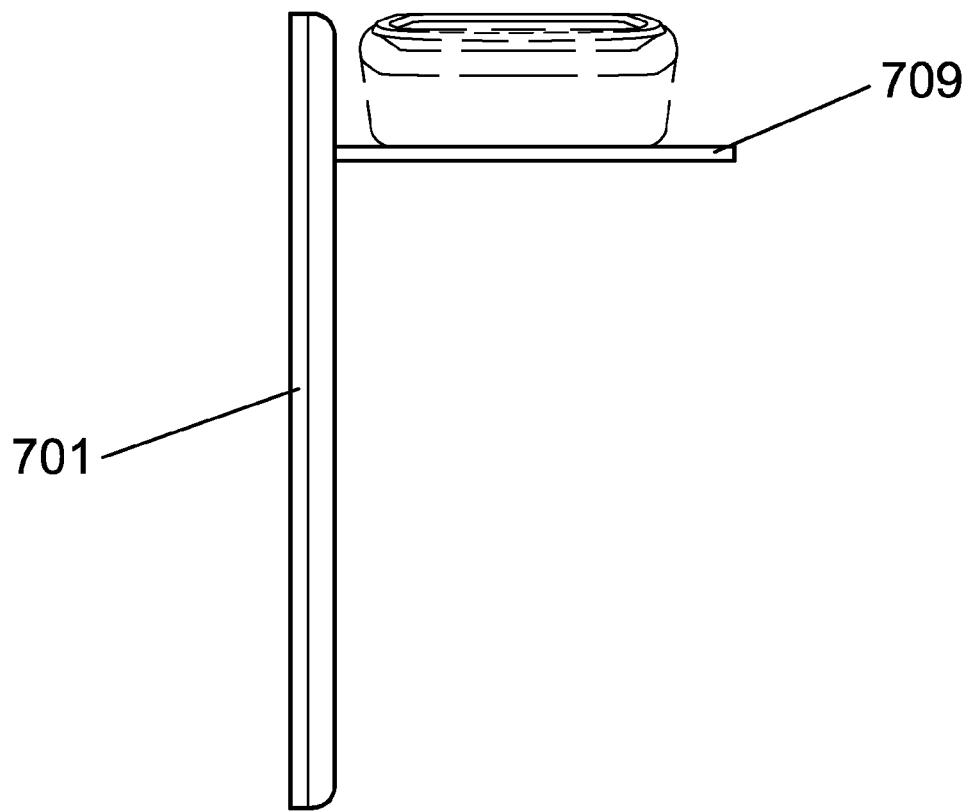
FIG. 10 is a side view of the cover plate with integral shelf of FIG. 7.
Figure 11:
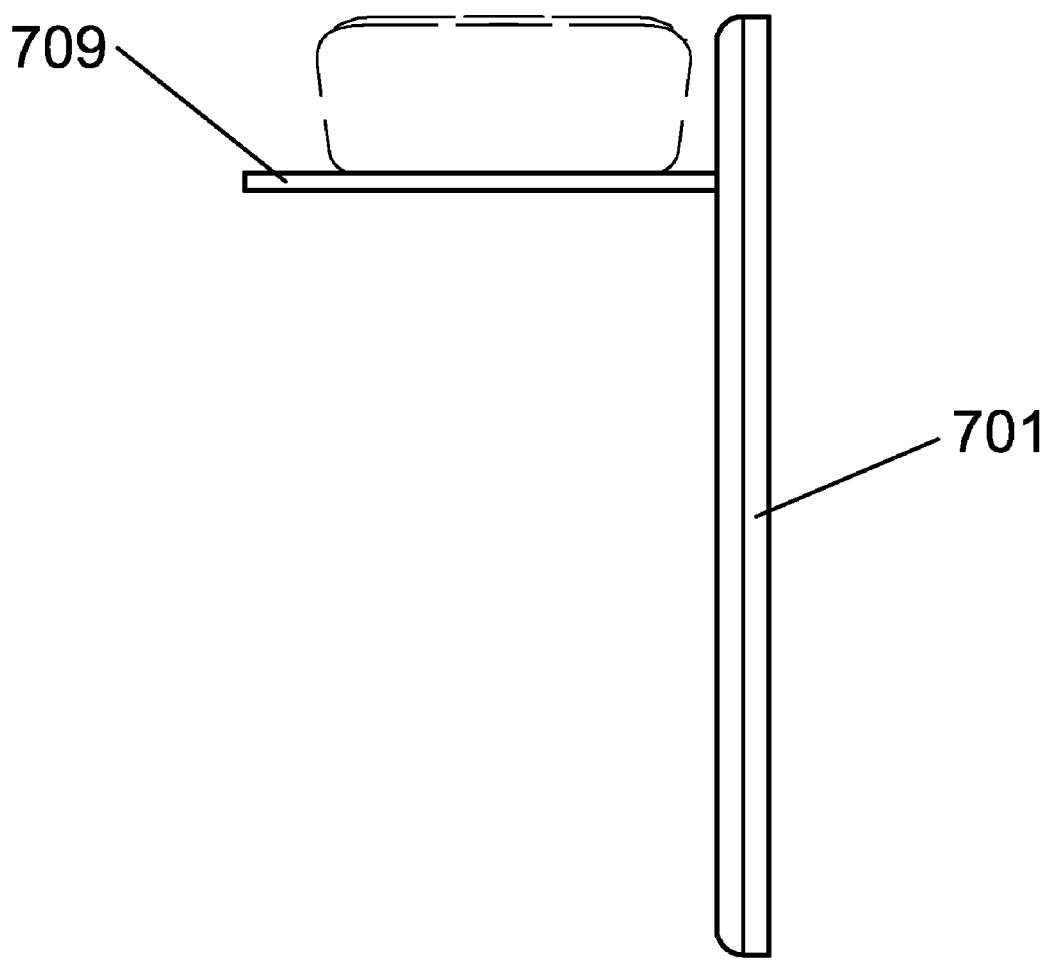
FIG. 11 is an alternate side view of the cover plate with integral shelf of FIG. 7.

In FIG. 10, a side view of the cover plate with integral shelf of FIG. 7 is depicted, showing the attachment member 701 and the shelf 709. A cell phone is depicted in broken line representation resting on the shelf 709. An alternate side view is shown in FIG. 11, with the attachment member 701 and the shelf 709 depicted. A cell phone is depicted in broken line representation resting on the shelf 709.

Figure 12:
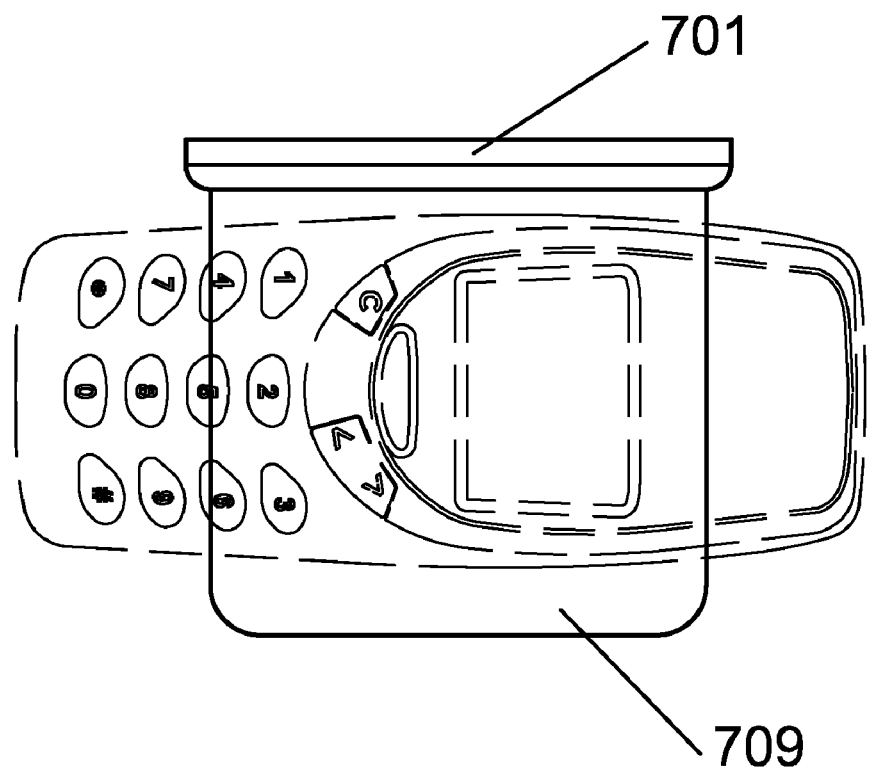
FIG. 12 is a downward looking plan view of the cover plate with integral shelf of FIG. 7.

FIG. 12 is a downward looking plan view of the cover plate with integral shelf of FIG. 7, showing the attachment member 701 and the shelf 709. A cell phone is depicted in broken line representation resting on the shelf 709.

Figure 13:
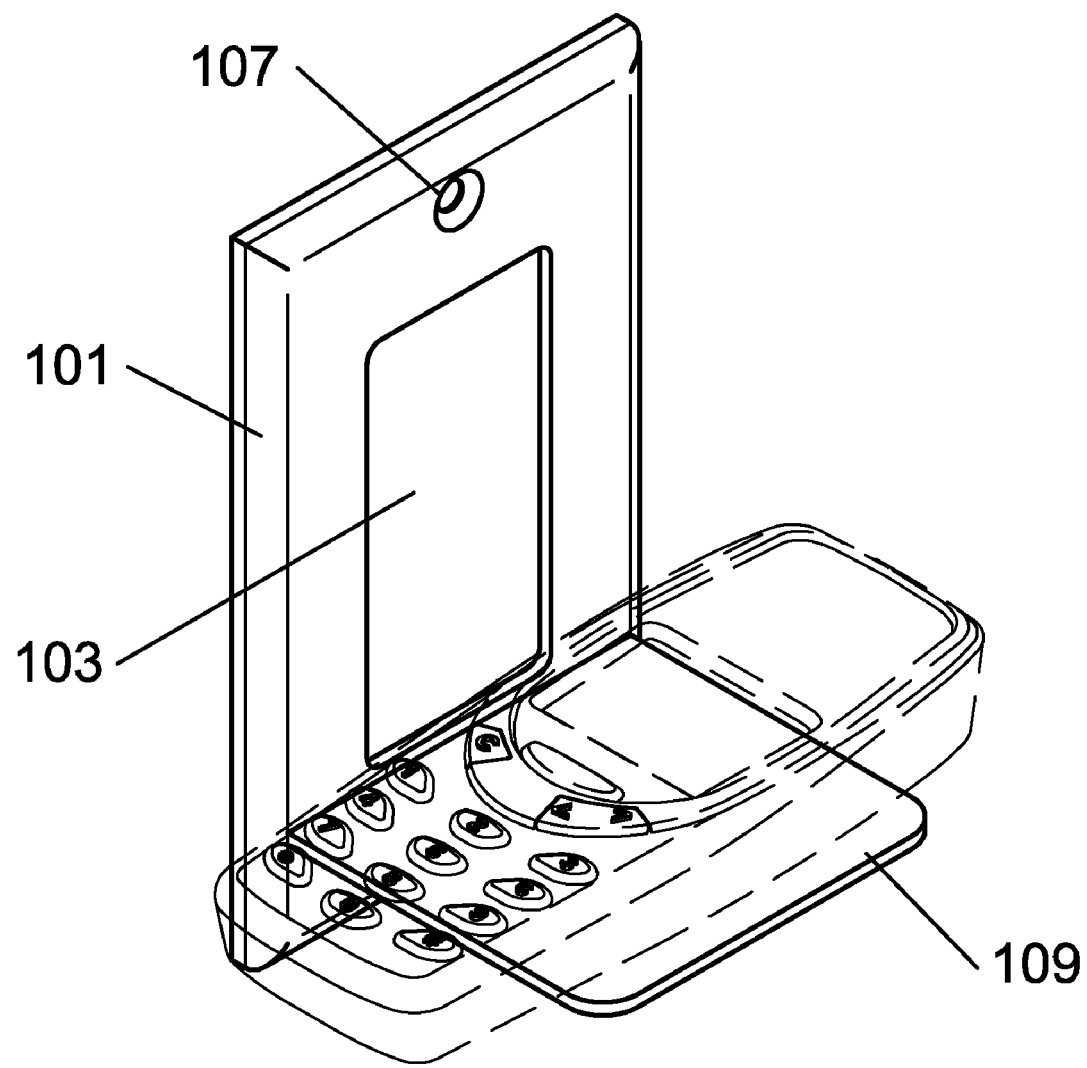
FIG. 13 is a perspective view of the cover plate with integral shelf of FIG. 1, only installed upside down with respect to that shown in FIGS. 1-6.
Figure 14:
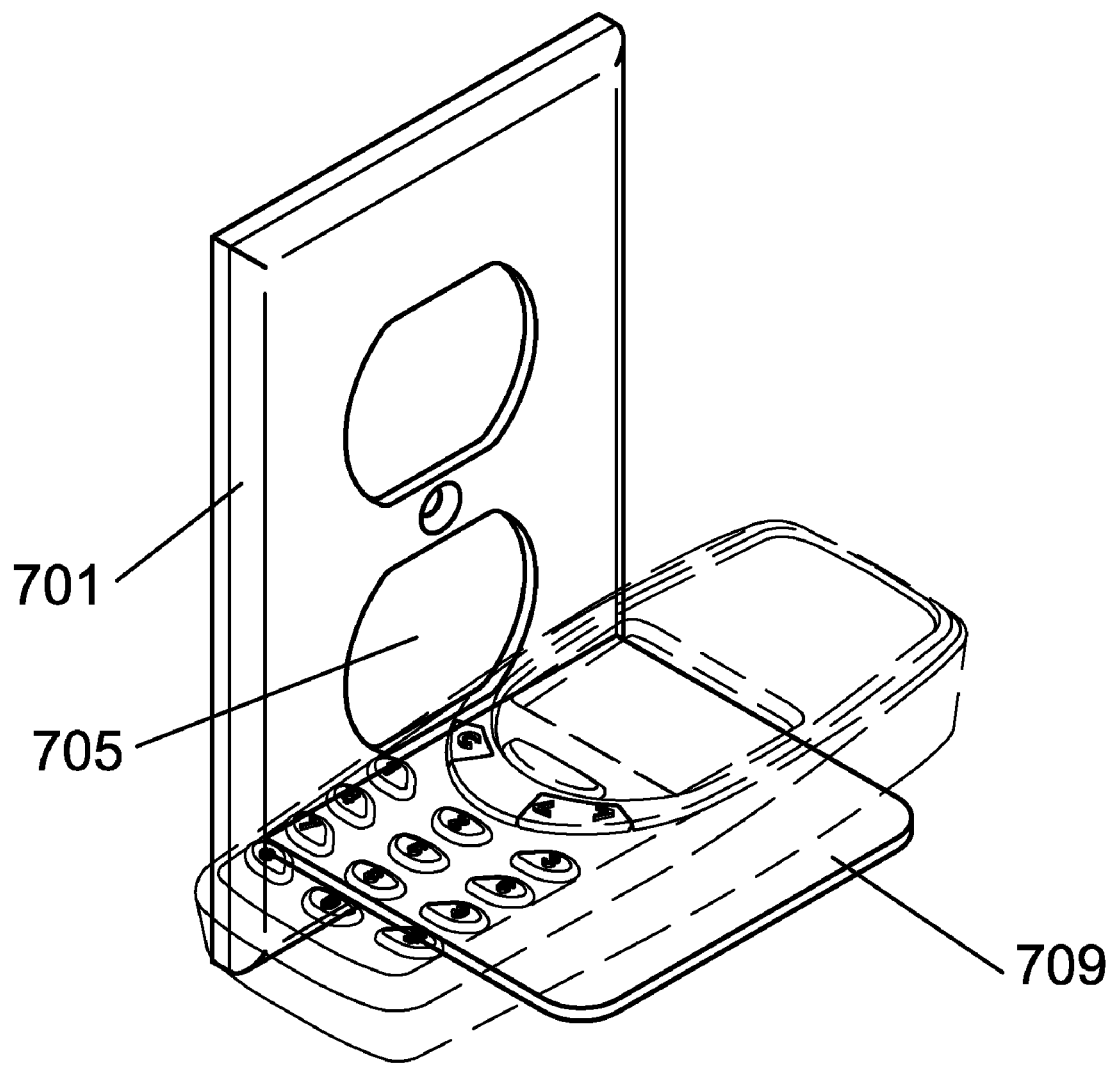
FIG. 14 is a perspective view of the cover plate with integral shelf of FIG. 7, only installed upside down with respect to that shown in FIGS. 7-12.

It should be noted that the cover plate with integral shelf can be installed and used in either direction. FIGS. 13 and 14 depict installation and use with orientation rotated with respect to FIGS. 1-12.

It is, therefore, apparent that there has been provided, in accordance with the various objects of the present invention, a cover plate with integral shelf. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, drawings, and the claims appended herein.

What is claimed is:

1. A cover plate for covering a wall box mountable wiring device mounted in and to a wall box, said wall box having a width dimension and a height dimension, said cover plate having a width dimension greater than said wall box width dimension and a height dimension greater than said wall box height dimension, the cover plate comprising: a unitary, generally planar attachment member having a first end and a second end; at least one mounting hole for permitting said attachment member to be attached adjacent a front face of and over said wiring device mounted in and to said wall box; at least one opening for at least one wiring device; and a shelf attached proximate the first end wherein at least part of the shelf is slightly pitched with a downward slope toward the attachment member.

2. The cover plate of claim 1, wherein said wiring device is a receptacle.

3. The cover plate of claim 1, wherein said wiring device is a ground fault circuit interrupter receptacle.

4. The cover plate of claim 1, wherein said wiring device is a switch.

5. The cover plate of claim 1, wherein said wiring device is a combined switch and receptacle.

6. The cover plate of claim 1, further comprising a second mounting hole.

7. The cover plate of claim 1, wherein the at least one mounting hole is hidden.

8. The cover plate of claim 1, further comprising a second mounting hole and wherein the first and second mounting holes are hidden.

9. The cover plate of claim 1, further comprising a second opening for a wiring device.

10. The cover plate of claim 1, further comprising a non-slip surface on said shelf.

11. The cover plate of claim 1, wherein said shelf is removable.

12. The cover plate of claim 1, wherein said shelf is glued to the attachment member.

* * * * *